3,488,489
NON-GLARE LIGHT FOR ALL WEATHER AND
ALL MEDIUMS
Charles L. Jones, Los Angeles, Calif., assignor of fifty
percent to Reginald H. Hargraves, Los Angeles, Calif.
Filed Mar. 6, 1967, Ser. No. 620,966
Int. Cl. F21v 13/04
U.S. Cl. 240—46.01                                          6 Claims

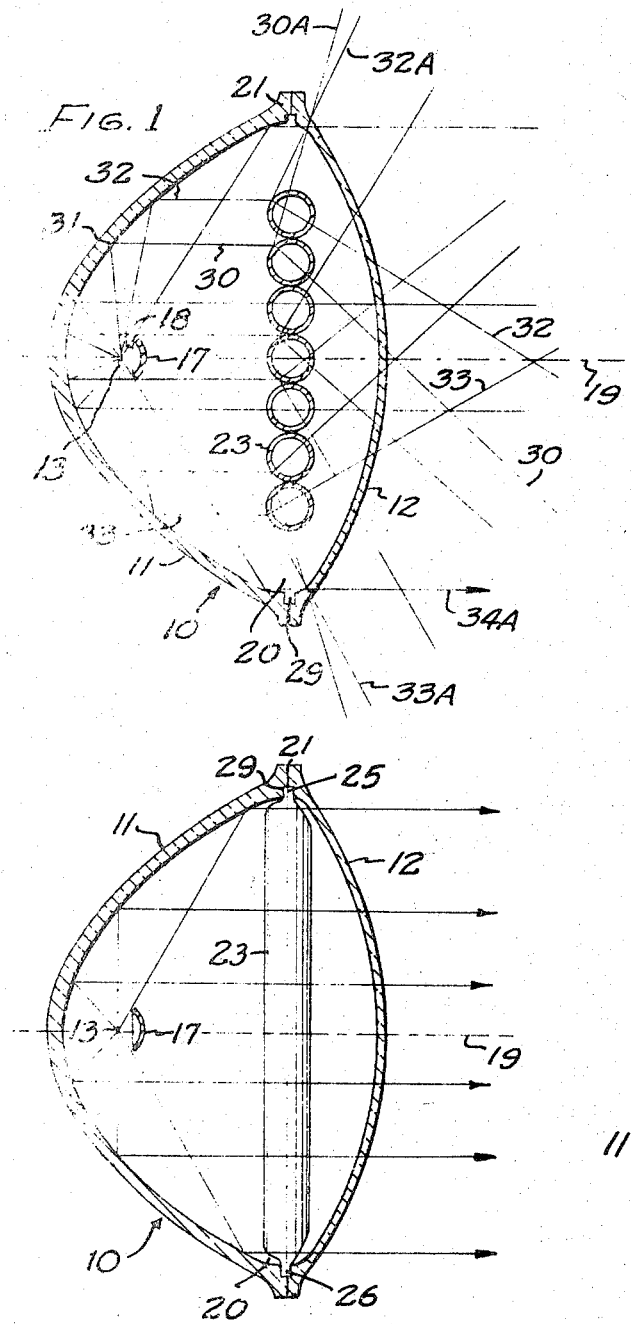
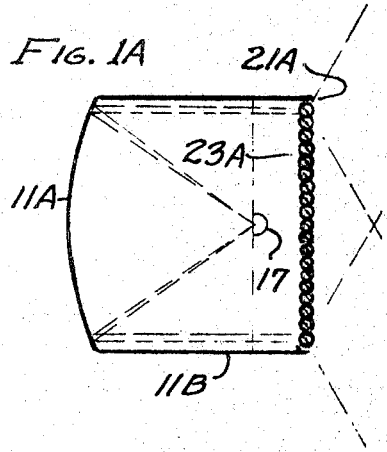
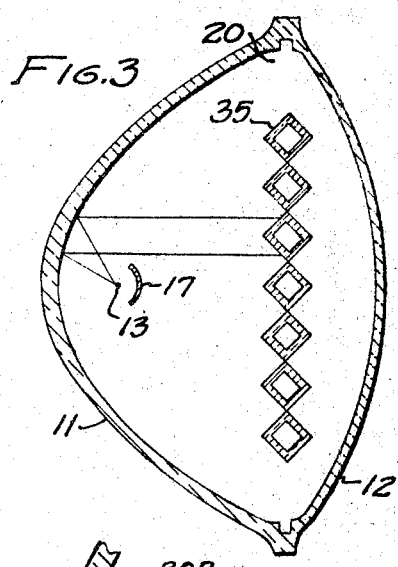
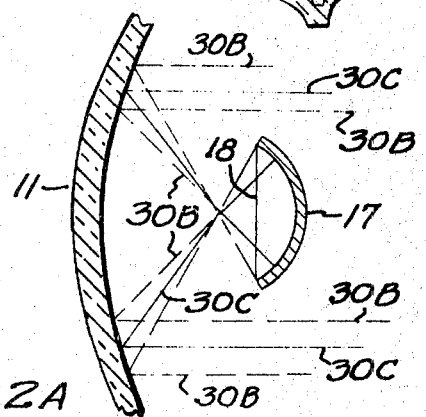
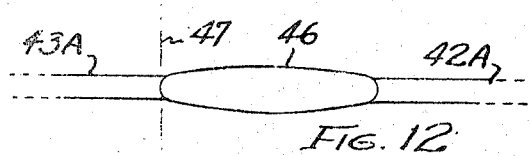

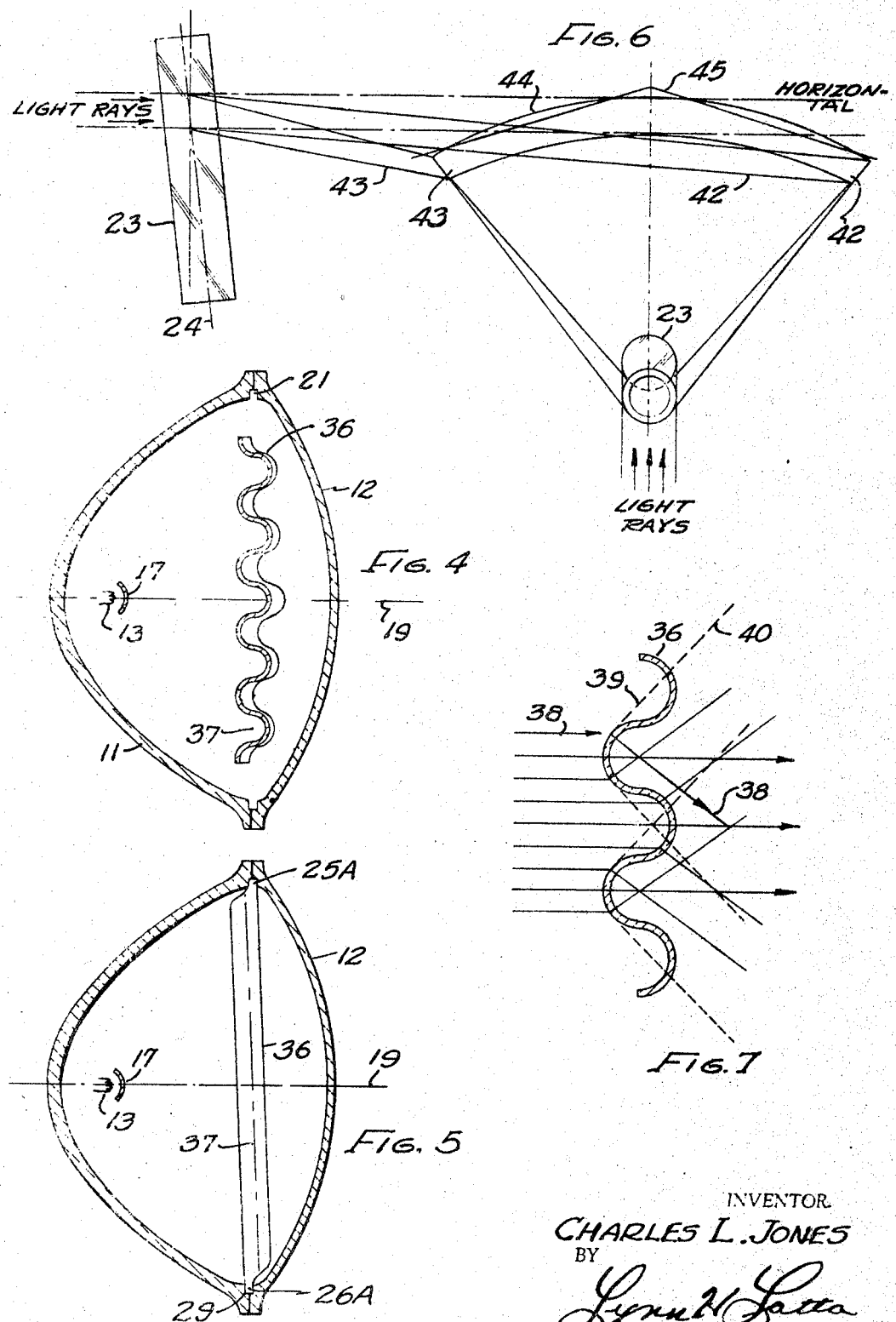

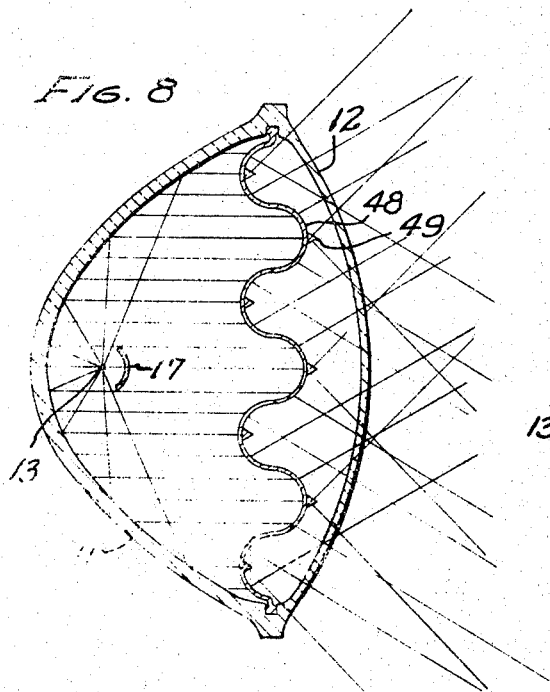
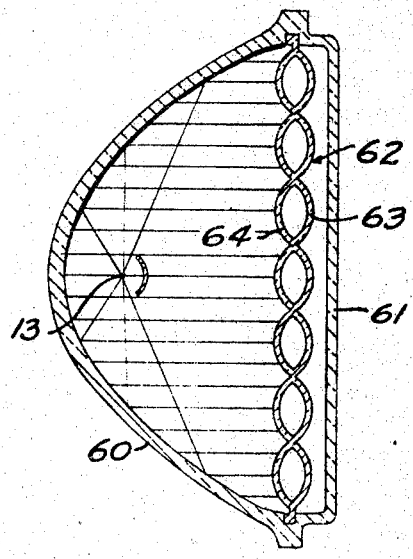
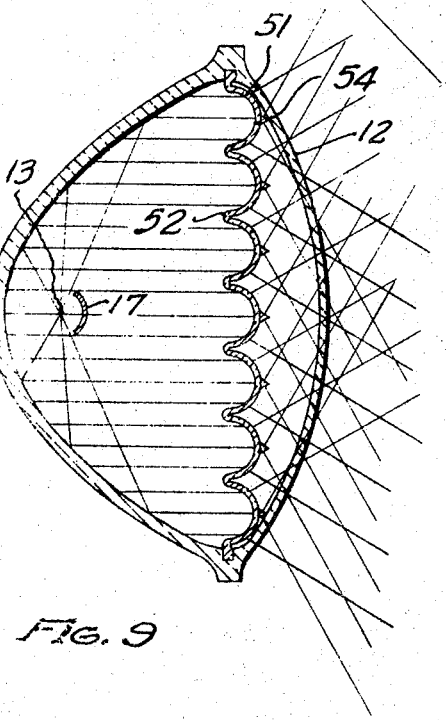
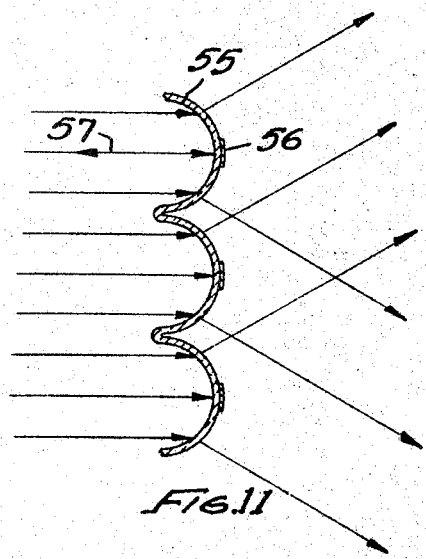

ABSTRACT OF THE DISCLOSURE

A non-glare light having a light source, a parabolic reflector, a shield and a refractor adjacent the outer end of the reflector. The non-glare light produces an undiffused beam having substantially no spread in the vertical direction and having a ribbon of light of maximum intensity in a horizontal direction. The light shield causes all emitted light to be reflected. The refractor consists of of a number of elongated elements having their sides in adjoining relation and their longitudinal axes parallel in a common plane in the plane of the reflector rim. The common plane is tilted from the vertical about a transverse horizontal axis.

BACKGROUND OF THE INVENTION

The invention may be used in automobile headlights, fog lights, aircraft landing lights, underwater lights, beacons, ship's docking lights, specialized outdoor lighting, and particularly for any medium which is normally difficult to penetrate and in which difficulties occur in the prior art lights because of glare and because of reflection back from the medium being penetrated.

The following United States patents are known prior art: No. 2,933,595 to Tabouret; No. 2,021,790 to Kuhn; and No. 2,102,928 to Van Leunen. In contrast to the prior art, the present invention eliminates glare, eliminates reflection back from an interference such as fog, and provides a controlled beam without diffused light.

SUMMARY OF THE INVENTION

The invention provides means by which only reflected light is emitted from a parabolic reflector and which reflected light is passed through a refraction means adjacent the outer end of the reflector. Considering the light in a position as it would be found on an automobile, the light rays from the reflector and refraction means form a substantially horizontal nondiffused beam of light having a distinct horizontal upper and lower cut off, and producing a ribbon of light which is narrow vertically and relatively widespread horizontally. The proportions and shape of the beam are adjustable.

The vertical depth of the beam is dependent upon the length of the refraction means in proportion to the diameter of the parabolic reflector. The horizontal spread of the beam is controlled by the positioning of the refraction means on the longitudinal main axis of the parabolic reflector. Control of the depression or elevation of the angular components of the side beam without altering the central main beam position is provided for by forward-backward tilting of the refraction means.

An object of the invention is to provide an improved lighting apparatus particularly adapted for use with an electrically energized light source.

It is another object of the invention to provide an improved light which produces a beam of reflected light and which contains no diffused light.

It is still another object of the invention to provide a beam of light produced within a parabolic reflector and which when viewed from outside of the projected beam of light produces no glaring or dazzling effect.

It is a further object of the invention to produce a collimated light beam from a parabolic reflector through a reflection means, and then to pass the collimated beam through a refracting lens system arranged to spread the emitted light in substantially a single plane, and which eliminates stray light.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

FIG. 1 is a cross-sectional plan view of an electric lamp embodying the present invention;

FIG. 1A is a schematic cross-sectional plan view of a modified form of light embodying the invention;

FIG. 2 is a cross-sectional side view of the lamp shown in FIG. 1;

FIG. 2A is a fragmentary sectional view illustrating the operation of the shield;

FIG. 3 is a view illustrating another embodiment of the invention;

FIG. 4 is a cross-sectional plan view of still another embodiment of the invention;

FIG. 5 is a cross-sectional side view of the embodiment shown in FIG. 4;

FIG. 6 is a schematic view of light paths as developed in the operation of the structures shown in FIGS. 1 and 2;

FIG. 7 is a fragmentary cross-sectional view of the refraction means of FIG. 4, illustrating the refraction of light beams passing therethrough;

FIG. 8 is a cross-sectional view of a lamp according to the invention illustrating a refraction means in which all light passing therethrough is refracted;

FIG. 9 is a cross-sectional view of the lamp similar to that shown in FIG. 8 but having a varied type of refraction means;

FIG. 10 is a view of another embodiment of the invention;

FIG. 11 is a fragmentary cross-sectional view of a refraction means, according to the invention, by which some of the light paths are reflected rather than refracted; and FIG. 12 is a diagram of the light beam from the lamp of FIG. 1, as projected on a vertical plane in front of the lamp.

DESCRIPTION OF THE PREFERRED EMBODIMENTS

Referring again to the drawings, there is shown in FIGS. 1 and 2 an electric lamp 10 formed of a parabolic reflector 11 and having an externally convex and internally concave glass lens 12. The light is generally of the form of a sealed automotive headlight having its electrically energizable filament 13 or other suitable light source located at the focal point of the parabolic reflector. Centrally positioned within the reflector 11 is a shield in the form of a segment of a sphere, having its center at the focal point 13 and having its base line 18 perpendicular to the main axis 19 of the parabolic reflector. The concave surface of the shield 17 preferably is reflectorized to provide increased light reflection back to the surface of the parabolic reflector. The shield must be of a size so that it is wide enough at its base line 18 to prevent the emission of any direct or nonreflected light outwardly of the emission end 20 of the parabolic reflector formed by a circumferential edge 21. Thus, the shield prevents the emission of any stray light from the reflector 11 and the lamp 10.

In FIG. 1, there is shown in cross-section a plurality of preformed refractor elements 23 in tangential relationship, disposed in a transverse row and having their longitudinal axes disposed in a transverse plane extending across the emission end 20 of the reflector. The refractor elements of FIG. 1 can be transparent tubes, as shown, or can be cylindrical rods. FIG. 1 illustrates the tubes in horizontal section.

In FIG. 2 the tubes are shown to be vertical in side elevational view and having the plane of their axes perpendicular to the main axis 19. The tubes do not extend across the entire end of the reflector but are spaced horizontally a predetermined amount from the rim 21, as shown in FIG. 1. The tubes, as shown in FIG. 2 extend for the full height of the reflector end 20. At their upper and lower ends, they may have spaced nibs 25 and 26, respectively, so that they may be secured and/or rotated within a peripheral groove 29 outwardly of the reflector rim 21.

As may be seen in FIG. 1, all of the light emitted from the filament 13 is either directly impinged upon the reflector or upon the concave surface of the shield from which it is reflected back to the reflector. By this arrangement, when a ray of light such as 30 impinges upon the reflector as at 31, the angle of incidence being equal to the angle of reflection, the ray is reflected outwardly in a direction parallel to the main axis (i.e. collimated). As shown it strikes a tube and is refracted horizontally.

Only the initial refraction through the tube is shown. Where the ray first strikes the tube there is a reflected portion, designated 30A, which is emitted from the lamp through another tube where it is refracted, the refraction path not being shown. Next to the ray 30 within the reflector is a ray 32 which is refracted horizontally. Ray 30 has a portion designated in broken line 32A and which is reflected horizontally outwardly from the side of the lamp.

In general, the rays of light are refracted horizontally in both directions from each refractor element. A ray 33, for example, is refracted to one side and has a portion 33A reflected to the other side and out of the lamp. Another ray 34A is emitted unrefracted, not passing through the tubes but being reflected directly outwardly from the reflector.

In FIG. 2, all of the rays are shown as passing through the refractor lens structure, being reflected from the reflector, passing horizontally through the tubes without being refracted vertically, and remaining horizontal because they strike the vertical tubes at right angles. The insignificant refraction from the cover lens 12 is not shown. From the foregoing, it is seen that the vertical width of the beam has no dispersion as it passes through the tubes (refraction in a single horizontal plane). Stated differently, the vertical depth of the beam is controlled by the length of the tubes. The vertical depth of the beam is also controlled by the positioning of the refractor lens 23 in relation to the longitudinal axis of the reflector. Irrespective of the cover lens the beam has a distinct upper and lower cutoff so as to produce a narrow vertical width.

As indicated in FIG. 1 and the discussion relative thereto, the beam in plan view is relatively widespread due to the lateral refraction of the light by the tubes. When the tubes are not extended entirely across the emission end of the reflector, as shown in FIG. 1, part of the light is non-refracted and this permits a vertical widening of the central core of the beam so that the beam is centered in the driving lane (when the lamp is used as a headlight, for example).

When the refractor lens element extends completely across the reflector, the vertical depth of the beam is substantially less and the beam is sharper. The resulting beam of light in either event is non-glaring and non-dazzling to anyone facing the light and outside of its well defined projection. For example, if a person faces the light so that it shines upon him, including part of the face, but not directly into the eyes, there is no glare or dazzling effect in the person's eyes. The light projects a proper character of light with a sufficient beam spread to cover a highway without a glaring or dazzling effect to the eyes when viewed from outside the projected beam of light.

In FIG. 2A, rays intercepted by shield 17 and reflected back to reflector 11 and thence into the collimated beam, are shown in broken lines at 30B, and direct rays which are reflected only once, from reflector 11, are shown in full lines at 30C.

FIG. 1A shows how the invention can be embodied in a large search light in which a parabolic reflector 11A constitutes the back end of a cylindrical light housing 11B. A shield 17 is positioned concentric with the optical focus of reflector 11A, and a row of abutting parallel refractor elements 23A, shown as solid transparent rods, are positioned ahead of the shield 17, substantially in the plane of housing rim 21A. Light rays reflected forwardly from reflector 11A are refracted and spread by refractor elements 23A.

If a headlight is required using a high and low beam, the spherical shield may be altered to utilize two filaments to give the same effect as with one filament.

In FIG. 3, illustrating a plan view, there is shown a light with the same characteristics as that in FIG. 1 except that instead of being tubular, the refractor elements are rectangular transparent prisms arranged with their opposite corner edges in adjoining relation, having their axes in a common transverse plane. This light functions in substantially the same manner as that described in FIGS. 1 and 2 (and in FIG. 9, described hereinafter).

In FIGS. 4 and 5 there is shown a lamp having the same elements as in FIGS. 1 and 2 except for the refraction means. Here, the refraction lens is embodied in a single transparent sheet 36 which is generally of the same configuration as in the previous embodiments but in the form of corrugations. The corrugations resemble sine curves and each curve has its center in a common plane 37 which, as may be best seen in FIG. 5, is tilted fore-aft with reference to the optical axis 19. The ends of the refractor lens 36 are spaced horizontally from the edge 21 of the reflector as shown in the plan view in FIG. 4. Vertically, the lens 36 extends across the entire emission end of the reflector, as best seen in FIG. 5. The lens 36 is held in place by means of nibs 25A and 26A, circumferentially spaced from each other in the groove 29 across the top as well as across the bottom, or which may extend each as one single lip, across the top and across the bottom to hold the sheet in place. Since the groove 29 is peripheral, the lens 36 may be easily rotated, in situations where it is desired to rotate the beam whereby the ordinarily wide horizontal beam can become the vertical beam.

The view shown in FIG. 5 can also be considered to be a side view of the refraction lens in FIGS. 1, 3, 8 and 11 when the respective planes corresponding to 37 are tilted.

In FIG. 7, a portion of a refractor lens 36 is shown to illustrate the reflection and refraction when the plane of the sheet is perpendicular to the optical axis. For example, a ray 38 is shown to be refracted in the same way as the ray 30 passing through a tube in FIG. 1. Similarly, this ray has a reflected portion 39 which is refracted as indicated at 40 when it passes through another curved portion of the sheet. Thus, it is clear that a sheet formed of successive sinuous curves has substantially the same refracting effect as a tubular refractor lens.

In FIG. 6, the effect of the tilting of the plane of the refractor lens 23 is illustrated. At the left of the drawing, a side elevational view of the refractor lens 23 is shown, and at the right of the drawing, the same circular view is shown in plan. The tilting of the median plane 24 rearwardly above the optical axis causes the lateral portions 42 and 43 of the beam to be refracted downwardly in contrast to the beam in FIG. 2 which is a straight line beam. This lowers the outer side portions of the beam vertically and where used as a fog light, for example, causes the beam to be bowed into an arc 44 to conform to the perspective of the sides of a road extending forwardly in a driver's vision to a vanishing point in the distance, as indicated at 45 in FIG. 6.

In FIGS. 8 and 9, there are shown two lamps in which a sheet of sinuous curves extend entirely across the face of the reflector to cause all light that is emitted to be refracted. This prevents the emission of light which is only reflected. Thus, the beam is cut off more sharply so as to be narrower vertically. This provides a moderate degree of polarization due to the complete elimination of direct forward rays.

In FIG. 8, the refraction means is a sheet 48 formed in the shape of a sine curve in cross-section, formed with integral prisms 49 on the forward face at the crests and nadirs of the curves where without the prisms some light would pass through, unrefracted.

In FIG. 9, a different form of a sheet 50 of sinuous curves is illustrated. Here, the curve area of the sheet is substantially all convex, as at 31, with respect to the cover lens, and the curves 51 are joined by substantially smaller curves 52 which are concave with respect to the cover lens. In this embodiment, prisms 54 are positioned in the same manner on the crests as in FIG. 8 and because of the nature of the curves 52, very little or no direct forward rays can pass through, as any irregularity from a true circular surface causes refraction. Further, the sheet can be extruded so that a surface would be presented that would cause refraction.

In FIG. 11, there is shown a portion of a transparent sheet 55 having the same general configuration as that shown in FIG. 9. At the crests of each of the large curves, there is an elongated strip 56, extending the full length of the sheet. These strips may be of any opaque material having the reflectorized surfaces facing inwardly to prevent the passage of nonrefracted light as indicated by the ray 57 which is reflected by a strip 56. Thus, all light which passes through the sheet 55 will be refracted.

In FIG. 12 I have shown approximately the cross-sectional shape of the beam projected from the lamp of FIG. 1. This diagram can also be taken as representing the beam as intercepted by a plane surface substantially at right angles to the beam axis. The central portion of the beam, indicated at 46 in the diagram is the intensified portion resulting from the open spaces between the sides of refraction lens 23 and the sides of rim opening 20. The side portions of the beam, are indicated at 42A and 43A. The broken line 47 indicates the location of the center stripe of a roadway with reference to the beam, showing how maximum illumination is projected on the driver's side of the roadway (to the right of the center of the road).

One of the advantages of the invention is in eliminating the necessity for a multi-beam light and a dimmer circuit in addition to a bright illumination circuit. The invention provides a sufficiently sharp cutoff along the edges of the beam section so that the same beam can be used both for close and for distant road illumination without producing glare in the eyes of an oncoming motorist.

In FIG. 10, there is a lamp having a parabolic reflector 60 with a flat cover lens 61. Also extending completely across the emission end is a preformed sheet of transparent material 62 of the type previously described. Here, the tubular refractor elements, joined together, are ovoidal in cross-section having walls such as 63 and 64. These walls have larger radii than, for example, the tubes as shown in FIG. 1. Stated differently, they have flatter curves than those in FIG. 1. These surfaces on walls 63 and 64 provide a narrower horizontal width of the beam in that the angle of refraction for any ray of light is smaller than it would be if the radii of the curved surfaces were shorter. The flat cover lens 61 limits the vertical width of the beam in that there is no refraction when the light passes through the cover lens in a direction perpendicular to it.

From the foregoing, it is clear that the various embodiments of the invention provide the advantages and features of non-glare or very low glare lighting, the wide-angle spread of the beam in one plane, selectivity of the angle of the plane of the wide beam at will by rotation of the refraction means as a unit about the optical axis or by the rotation of the entire lamp itself, and the ability to control the depression or elevation of the angular components of the side portions of the beam without altering the central main beam position, by forward-backward tilting of the refraction lens.

The refractor lens of my invention may be made of glass, transparent plastic or ceramic material or any other suitable material, and the cross-sectional contours of the refractor elements may be oval, round, square, rectangular, tubular or solid.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example. I do not wish to be restricted to the specific forms shown or uses mentioned except as defined in the accompanying claims, wherein various portions have been separated for clarity of reading and not for emphasis.

I claim:
1. A non-glare light comprising:
   (a) a parabolic reflector;
   (b) a light source at the focal point of said reflector;
   (c) a shield between said light source and a light emission end of said reflector to prevent emission of nonreflected light, said shield being a segment of a sphere having its center at said focal point; and
   (d) refraction means comprising a plurality of elongated refractor elements disposed with their sides in adjoining relation and their longitudinal axis parallel, in a common plane located substantially in the plane of the reflector rim;
   (e) said common plane being tilted from the vertical about a transverse horizontal axis.
2. A non-glare light comprising:
   (a) a parabolic reflector;
   (b) a light source at the focal point of said reflector;
   (c) a shield between said light source and a light emission end of said reflector to prevent emission of nonreflected light, said shield being a segment of a sphere having its center at said focal point; and
   (d) refraction means comprising a plurality of elongated refractor elements disposed with their sides in adjoining relation and their longitudinal axis parallel, in a common plane located substantially in the plane of the reflector rim;
   (e) said refraction means comprising a corrugated sheet of transparent material, the corrugations being curved.
3. The invention according to claim 2, wherein said corrugations are sinuously curved and have axes lying in a common plane transverse to the optical axis of said light.
4. The invention according to claim 2, wherein said corrugations have additional means thereon to effect refraction of all light passing therethrough.
5. A non-glare light comprising:
   (a) a parabolic reflector;
   (b) a light source at the focal point of said reflector;
   (c) a shield between said light source and a light emission end of said reflector to prevent emission of nonreflected light, said shield being a segment of a sphere having its center at said focal point; and

(d) refraction means comprising a plurality of elongated refractor elements disposed with their sides in adjoining relation and their longitudinal axis parallel, in a common plane located substantially in the plane of the reflector rim;
(e) said refraction means comprising a row of glass tubes having their axis throughout their length in a transverse plane; and
(f) said tubes having approximately ovoidal cross-section.

6. A non-glare light comprising:
(a) a parabolic reflector;
(b) a light source at the focal point of said reflector;
(c) a shield between said light source and a light emission end of said reflector to prevent emission of nonreflected light, said shield being a segment of a sphere having its center at said focal point; and
(d) refraction means comprising a plurality of elongated refractor elements disposed with their sides in adjoining relation and their longitudinal axis parallel, in a common plane located substantially in the plane of the reflector rim;
(e) said refraction means comprising a plurality of semicylindrical, elongated elements joined to form a single member;
(f) the axes of said semicylindrical elements being in a common transverse plane with respect to the main axis of the reflector; and
(g) said elements all being convex on their forward sides.

References Cited

UNITED STATES PATENTS

| | | | |
|---|---|---|---|
| 2,089,351 | 8/1937 | English | 240—46.59 XR |
| 2,115,906 | 5/1938 | Dickson et al. | 240—41.4 XR |
| 2,933,595 | 4/1960 | Tabouret | 240—46.59 XR |

FOREIGN PATENTS

| | | |
|---|---|---|
| 72,792 | 11/1959 | France. |
| 1,194,633 | 5/1959 | France. |
| 313,721 | 6/1929 | Great Britain. |

OTHER REFERENCES

A.P.C. application of W. Geffcken, Ser. No. 397,213, published June 1, 1943.

NORTON ANSHER, Primary Examiner

ROBERT P. GREINER, Assistant Examiner

U.S. Cl. X.R.

240—41.4, 46.57, 46.59